(12) United States Patent
Nagaoka et al.

(10) Patent No.: US 11,205,533 B2
(45) Date of Patent: Dec. 21, 2021

(54) FERRITE SINTERED MAGNET, MOTOR AND GENERATOR

(71) Applicant: TDK Corporation, Tokyo (JP)

(72) Inventors: Junnichi Nagaoka, Tokyo (JP); Hiroyuki Ono, Tokyo (JP); Yuichi Sugawara, Tokyo (JP)

(73) Assignee: TDK Corporation, Tokyo (JP)

( * ) Notice: Subject to any disclaimer, the term of this patent is extended or adjusted under 35 U.S.C. 154(b) by 277 days.

(21) Appl. No.: 16/282,466

(22) Filed: Feb. 22, 2019

(65) Prior Publication Data

US 2019/0267167 A1  Aug. 29, 2019

(30) Foreign Application Priority Data

Feb. 26, 2018 (JP) .............................. JP2018-032015
Jun. 21, 2018 (JP) .............................. JP2018-118100

(51) Int. Cl.
| | | |
|---|---|---|
| *H01F 1/11* | (2006.01) | |
| *H01F 41/02* | (2006.01) | |
| *C04B 35/26* | (2006.01) | |
| *H01F 3/08* | (2006.01) | |
| *H02K 1/17* | (2006.01) | |
| *H02K 1/02* | (2006.01) | |

(52) U.S. Cl.
CPC .............. *H01F 1/11* (2013.01); *C04B 35/2683* (2013.01); *H01F 3/08* (2013.01); *H01F 41/0266* (2013.01); *H02K 1/17* (2013.01); *C04B 2235/3208* (2013.01); *C04B 2235/767* (2013.01); *C04B 2235/85* (2013.01); *H02K 1/02* (2013.01); *H02K 2213/03* (2013.01)

(58) Field of Classification Search
None
See application file for complete search history.

(56) References Cited

U.S. PATENT DOCUMENTS

| | | |
|---|---|---|
| 2009/0022992 A1 | 1/2009 | Takami et al. |
| 2009/0314981 A1 | 12/2009 | Yanagida et al. |
| 2011/0024672 A1 | 2/2011 | Takami et al. |
| 2012/0105185 A1 | 5/2012 | Oda et al. |
| 2012/0211910 A1 | 8/2012 | Takami et al. |

(Continued)

FOREIGN PATENT DOCUMENTS

| | | |
|---|---|---|
| CN | 101316803 A | 12/2008 |
| CN | 102473514 A | 5/2012 |

(Continued)

*Primary Examiner* — Xiaowei Su
(74) *Attorney, Agent, or Firm* — Faegre Drinker Biddle & Reath LLP

(57) ABSTRACT

A ferrite sintered magnet contains a main phase formed of ferrite having a hexagonal magnetoplumbite type crystalline structure; a first subphase containing La, Ca, and Fe, in which an atomic ratio of La is higher than that of the main phase, and the atomic ratio of La is higher than an atomic ratio of Ca; and a second subphase containing La, Ca, Si, B, and Fe, in which an atomic ratio of Ca is higher than an atomic ratio of La, an atomic ratio of B is higher than an atomic ratio of Fe, and the atomic ratio of Fe is lower than that of the main phase. An area ratio of the second subphase on a cross-sectional surface of the ferrite sintered magnet is greater than or equal to 1%.

20 Claims, 9 Drawing Sheets

(56) References Cited

U.S. PATENT DOCUMENTS

2013/0285779 A1* 10/2013 Kobayashi ........ C04B 35/62645
335/302
2015/0332819 A1 11/2015 Oda et al.
2019/0318856 A1 10/2019 Nagaoka et al.

FOREIGN PATENT DOCUMENTS

| CN | 102496438 A | 6/2012 |
| CN | 103282977 A | 9/2013 |
| CN | 110114844 A | 8/2019 |
| EP | 2 244 269 A1 | 10/2010 |
| WO | WO-2012/090935 A1 | 7/2012 |

* cited by examiner

FERRITE SINTERED MAGNET, MOTOR AND GENERATOR

TECHNICAL FIELD

The present disclosure relates to a ferrite sintered magnet, a motor, and a generator.

BACKGROUND

Ba ferrite, Sr ferrite, and Ca ferrite, having a hexagonal crystalline structure, are known as a magnetic material used in a ferrite sintered magnet. A magnetoplumbite type (M type), a W type, and the like are known as a crystalline structure of such ferrite. Among them, magnetoplumbite type (M type) ferrite is mainly adopted as a magnet material for a motor or the like. The M type ferrite is generally represented by a general formula of $AFe_{12}O_{19}$.

In general, a residual magnetic flux density (Br) and a coercive force (HcJ) are used as an index of magnetic properties of the ferrite sintered magnet. In the related art, it is considered to add various elements different from constituent elements of ferrite, from the viewpoint of improving Br and HcJ. For example, in International Publication WO 2012/090935, it is considered that a grain boundary phase (a second phase) and a third phase are generated in addition to a ferrite phase having a hexagonal M type magnetoplumbite structure, by adding $SiO_2$ and $CaCO_3$, and thus, magnetic performance is improved.

SUMMARY

A motor, a generator, and the like that are principal use of the ferrite sintered magnet, are required to be downsized in each of the technical fields. For this reason, an internal structure is complicated, and an installation space of a magnet becomes smaller. Therefore, in order to reduce the installation space, it is considered to decrease a thickness. However, in a case where the thickness decreases, there is a concern that the ferrite sintered magnet is degaussed according to a diamagnetic field.

Therefore, in one aspect of the present disclosure, a ferrite sintered magnet having a sufficiently high coercive force, is provided. In another aspect of the present disclosure, a motor or a generator including the ferrite sintered magnet having a sufficiently high coercive force, is provided.

In one aspect of the present disclosure, a ferrite sintered magnet, including: a main phase formed of ferrite having a hexagonal magnetoplumbite type crystalline structure; a first subphase containing La, Ca, and Fe, in which an atomic ratio of La is higher than that of the main phase, and the atomic ratio of La is higher than an atomic ratio of Ca; and a second subphase containing La, Ca, Si, B, and Fe, in which an atomic ratio of Ca is higher than an atomic ratio of La, an atomic ratio of B is higher than an atomic ratio of Fe, and the atomic ratio of Fe is lower than that of the main phase, in which an area ratio of the second subphase on a cross-sectional surface, is greater than or equal to 1%, is provided.

The ferrite sintered magnet described above, has a sufficiently high coercive force. A mechanism for improving the coercive force is not clear, but the following factors are conjectured. That is, the ferrite sintered magnet described above, contains the first subphase and the second subphase, having compositions different from each other, in addition to the main phase. Here, in order to improve the coercive force, it is considered that increasing a magnetic separation effect among particles of the main phase is effective. In order to increase the magnetic separation effect, it is considered to increase the thickness of the grain boundary phase. However, even though the thickness of the grain boundary phase is increased by the first subphase described above, it is difficult to improve the coercive force. It is considered that the ferrite sintered magnet described above, contains a predetermined amount of the second subphase, and thus, the second subphase contributes to an increase in the thickness of the grain boundary phase. It is conjectured that a high magnetic separation effect can be obtained, and the coercive force can be improved, according to the existence of the second subphase. However, the mechanism for improving the coercive force is not limited thereto.

In the second subphase described above, when a total of La, Ca, Si, B, and Fe is set to 100 atom %, a ratio of La may be 1 atom % to 25 atom %, a ratio of Ca may be 30 atom % to 70 atom %, a ratio of Si may be less than or equal to 50 atom %, a ratio of B may be 8 atom % to 60 atom %, and a ratio of Fe may be less than or equal to 20 atom %. Accordingly, it is possible to further improve the coercive force.

An area ratio of the first subphase on the cross-sectional surface of the ferrite sintered magnet may be less than or equal to 5%. Accordingly, it is possible to further improve the coercive force.

The ferrite sintered magnet described above may further contain $CaB_2O_4$. $CaB_2O_4$ is not a magnetic body, and a melting point (1128° C.) of $CaB_2O_4$ is close to a firing temperature of the ferrite sintered magnet. For this reason, wettability in liquid-phase sintering, or the like is improved, and the dispersibility of each element in the ferrite sintered magnet is improved. Accordingly, for example, it is considered that Fe on a B site of the hexagonal magnetoplumbite type ferrite that is the main phase, is easily substituted with Co. According to such an operation, it is possible to further improve the coercive force of the ferrite sintered magnet.

The second subphase may contain $CaB_2O_4$. In the second subphase, an atomic ratio of Fe having a comparatively high melting point, is lower than that of the main phase, and an atomic ratio of Ca having a comparatively low melting point, is higher than that of the main phase. It is considered that such a second subphase contains $CaB_2O_4$, and thus, the wettability in the liquid-phase sintering, can be further improved. An area ratio of $CaB_2O_4$ contained in the second subphase, to the cross-sectional surface of the ferrite sintered magnet, may be less than or equal to 2%.

In another aspect of the present disclosure, a motor including the ferrite sintered magnet described above, is provided. In still another aspect of the present disclosure, a generator including the ferrite sintered magnet described above, is provided. The ferrite sintered magnet described above, has a high coercive force. Such a ferrite sintered magnet can be mounted on the motor, the generator, and the like, by decreasing the thickness. Therefore, it is possible to contribute to the downsizing of the motor, the generator, or the like.

In one aspect of the present disclosure, it is possible to provide a ferrite sintered magnet having a sufficiently high coercive force. In another aspect of the present disclosure, it is possible to provide a motor or a generator including the ferrite sintered magnet having a sufficiently high coercive force.

DETAILED DESCRIPTION

Figure 1:
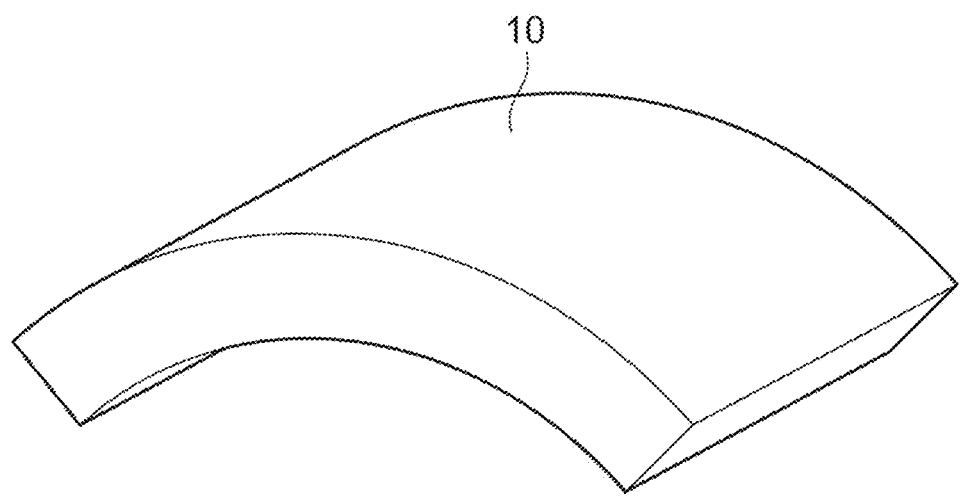
FIG. 1 is a perspective view schematically illustrating one embodiment of a ferrite sintered magnet.

Hereinafter, several embodiments will be described with reference to the drawings according to a case. In the description, the same reference numerals are used for the same elements or elements having the same function, and the repeated description thereof will be omitted according to a case. Furthermore, a dimension ratio of each member is not limited to the illustrated ratio.

FIG. 1 is a perspective view schematically illustrating a ferrite sintered magnet according to one embodiment. An anisotropic ferrite sintered magnet 10 has a curved shape such that an end surface is in the shape of a circular arc, and in general, has a shape referred to as an arc segment shape, a C-shape, a tegular shape, or an arched shape. The ferrite sintered magnet 10, for example, is preferably used as a magnet for a motor or a generator. However, the shape of the ferrite sintered magnet is not limited to the shape of FIG. 1.

The ferrite sintered magnet contains a main phase formed of a ferrite phase having a magnetoplumbite type crystalline structure. In the present disclosure, the "main phase" indicates a crystalline phase most commonly contained in the ferrite sintered magnet. The crystalline phase most commonly contained in the ferrite sintered magnet, is the ferrite phase. An area ratio of the main phase on a cross-sectional surface of the ferrite sintered magnet, for example, may be greater than or equal to 80%, or may be 85% to 98%.

The ferrite sintered magnet contains a first subphase and a second subphase, as a crystalline phase (a heterophase) different from the main phase. The first subphase contains La, Ca, and Fe, and in the first subphase, an atomic ratio of La is higher than that of the main phase, and the atomic ratio of La is higher than an atomic ratio of Ca. In addition, an atomic ratio Fe in the first subphase, may be lower than that of the main phase. The second subphase contains La, Ca, Si, B, and Fe, and in the second subphase, an atomic ratio of Ca is higher than an atomic ratio of La, an atomic ratio of B is higher than an atomic ratio of Fe, and the atomic ratio of Fe is lower than that of the main phase.

An area ratio of each of the main phase, the first subphase, and the second subphase in the ferrite sintered magnet, can be obtained by observing the cross-sectional surface of the ferrite sintered magnet with a scanning transmission electron microscope/energy dispersive X-ray analysis (STEM/EDX), and by performing image processing. The composition of each of the main phase and the first subphase can be measured by using STEM/EDX. The composition of the second subphase can be measured by using a scanning transmission electron microscope/electron energy-loss spectroscopy (STEM/EELS).

Figure 2:
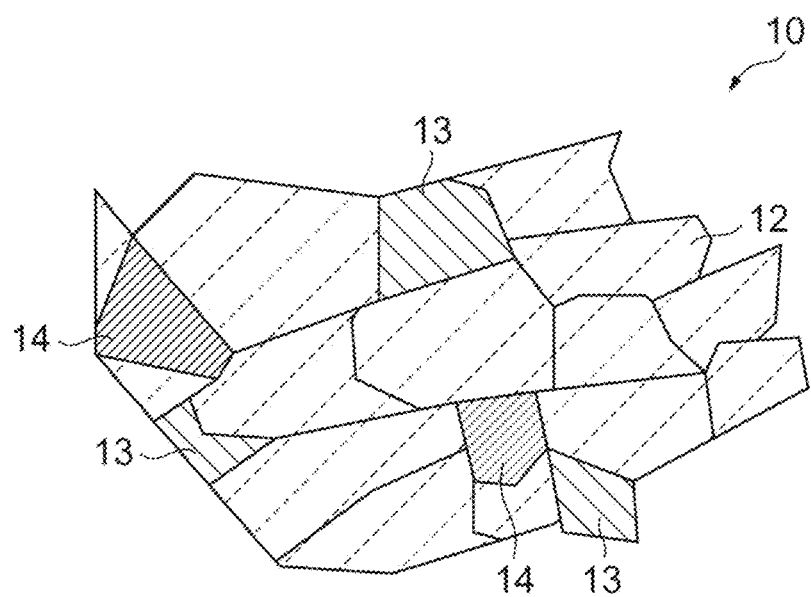
FIG. 2 is a diagram schematically illustrating a microstructure on a cross-sectional surface of the ferrite sintered magnet.

FIG. 2 is a diagram schematically illustrating a microstructure by enlarging a part of the cross-sectional surface of the ferrite sintered magnet. The ferrite sintered magnet 10 contains a main phase 12, and a first subphase 13 and a second subphase 14 included among the particles of the main phase 12. The main phase 12 is a ferrite phase having a hexagonal magnetoplumbite type crystalline structure. On the other hand, the first subphase 13 and the second subphase 14 are a heterophase having a crystalline structure different from that of the main phase 12. The first subphase may contain orthoferrite. The orthoferrite is a compound ($RFeO_3$) having a perovskite structure containing a rare earth element (R) and an iron element (Fe).

In the first subphase, when the total of La, Ca, and Fe is set to 100 atom %, for example, the ratio of La may be 10 atom % to 60 atom %, the ratio of Ca may be 0 atom % to 19 atom %, and the ratio of Fe may be 10 atom % to 60 atom %. The first subphase 13 may contain an element other than La, Ca, and Fe. Examples of such an element include Si. When the total of La, Ca, Fe, and Si is set to 100 atom %, for example, the ratio of Si may be 0 atom % to 19 atom %. At least ten first subphases 13 are arbitrarily extracted on the cross-sectional surface of the ferrite sintered magnet as illustrated in FIG. 2, and the composition of the first subphase can be obtained as the mean value of each analysis result.

An area ratio of the first subphase on the cross-sectional surface of the ferrite sintered magnet, may be less than or equal to 5%, may be 0.5% to 4%, or may be 1% to 3%. In a case where the area ratio of the first subphase excessively increases, there is a case where a sufficiently excellent coercive force is impaired. On the other hand, in a case where the area ratio of the first subphase excessively decreases, there is a case where a sufficiently excellent coercive force is impaired. The area ratio of the first subphase, for example, may be adjusted by changing a blending ratio of a raw material compound containing La at the time of blending raw materials.

The second subphase contains La, Ca, Si, B, and Fe, and in the second subphase, an atomic ratio of Ca is higher than an atomic ratio of La, an atomic ratio of B is higher than an atomic ratio of Fe, and the atomic ratio of Fe is lower than that of the main phase. In the second subphase, when the total of La, Ca, Si, B, and Fe is set to 100 atom %, for example, the ratio of La is 1 atom % to 25 atom %, the ratio of Ca is 30 atom % to 70 atom %, the ratio of Si is less than or equal to 50 atom %, the ratio of B is 8 atom % to 60 atom %, and the ratio of Fe is less than or equal to 20 atom %. The second subphase may not contain Co, from the viewpoint of increasing the content of Co in the main phase. In the second subphase, when the total of La, Ca, Si, B, Fe, and Co is set to 100 atom %, the ratio of Co may be less than or equal to 0.5 atom %. Accordingly, it is possible to increase the atomic ratio of Co in the main phase.

In the second subphase, when the total of La, Ca, Si, B, and Fe is set to 100 atom %, the total of the atomic ratio of Ca and the atomic ratio of La, for example, is 31 atom % to 95 atom %. The second subphase may contain an element other than the elements described above. At least ten second subphases 14 are arbitrarily extracted on the cross-sectional surface of the ferrite sintered magnet as illustrated in FIG. 2, and the composition of the second subphase can be obtained as the mean value of each analysis result.

An area ratio of the second subphase in the ferrite sintered magnet, is greater than or equal to 1%. The area ratio of the second subphase, for example, may be 3% to 20%, or may be 7% to 15%, from the viewpoint of sufficiently increasing a coercive force and a residual magnetic flux density. The area ratio of the second subphase can be adjusted by changing a blending ratio of a raw material compound containing boron (B) at the time of blending raw materials.

The ferrite sintered magnet may contain $CaB_2O_4$. A melting point (1128° C.) of $CaB_2O_4$ is close to a firing temperature of the ferrite sintered magnet, and thus, has an operation of improving wettability in liquid-phase sintering or the like. For this reason, the dispersibility of each of the elements in the ferrite sintered magnet is improved by containing $CaB_2O_4$, and Fe in the main phase is easily substituted with Co. Therefore, even in a case where the content of Co in the entire ferrite sintered magnet, is low, it is possible to efficiently incorporate Co in the main phase. Accordingly, even in a case where a used amount of Co is small, it is possible to sufficiently increase the coercive force of the ferrite sintered magnet.

$CaB_2O_4$, for example, is contained in the second subphase. It is considered that the second subphase contains $CaB_2O_4$, and thus, it is possible to further improve the wettability in the liquid-phase sintering. An area ratio of $CaB_2O_4$ contained in the second subphase, to the entire cross-sectional surface of the ferrite sintered magnet, for example, may be less than or equal to 2%, or may be 0.1% to 1%, from the viewpoint of sufficiently increasing the content of Co in the main phase while suppressing the ratio of a non-magnetic body. From the same viewpoint, the area ratio of $CaB_2O_4$ to the second subphase, for example, may be less than or equal to 11%, or may be 1.5% to 6.3%.

$CaB_2O_4$ contained in the ferrite sintered magnet, can be identified by observing the cross-sectional surface of the ferrite sintered magnet with a high-resolution transmission electron microscope (HRTEM), by performing two-dimensional Fourier transformation with respect to the observed image, and by obtaining surface spacing and a surface angle of crystal surfaces. In addition, it is possible to obtain the area ratio of $CaB_2O_4$ in the second subphase, from a portion identified as $CaB_2O_4$ and the area of the second subphase on the cross-sectional surface of the ferrite sintered magnet.

An atomic ratio (S) [Co/(Fe+Co)] of Co to the total of Fe and Co in the entire ferrite sintered magnet, for example, may be 2 to 4. In addition, an atomic ratio (P) [Co/(Fe+Co)] of Co to the total of Fe and Co in the main phase, for example, may be 3 to 5. A ratio of the atomic ratio (P) to the atomic ratio (S), may be greater than 1.2, may be greater than or equal to 1.3, or may be greater than or equal to 1.4. Thus, the ratio of the atomic ratio (P) to the atomic ratio (S) increases, and thus, even in a case where the used amount of Co is reduced, it is possible to obtain the ferrite sintered magnet having a sufficiently high coercive force. The ferrite sintered magnet of this embodiment, contains $CaB_2O_4$, and thus, it is possible to increase the ratio of the atomic ratio (P) to the atomic ratio (S).

When the overall composition of the ferrite sintered magnet containing the main phase, the first subphase, and the second subphase, is represented by General Formula (I) described below, Expressions (1), (2), and (3) described below, may be satisfied. In General Formula (I), x, y, and m represent a ratio on a molar basis. In General Formula (I), R represents La or at least one type of element selected from a rare earth element including La and Y, and A represents Ca, or Ca and an element consisting of one or both of Sr and Ba.

$$R_{1-x}A_xFe_{m-y}Co_y \tag{I}$$

$$0.2 \leq x \leq 0.8 \tag{1}$$

$$0.1 \leq y \leq 0.65 \tag{2}$$

$$3 \leq m < 14 \tag{3}$$

In General Formula (I), x may be less than or equal to 0.7, or may be less than or equal to 0.6, from the viewpoint of further increasing coercive force. From the same viewpoint, x may be greater than or equal to 0.25, or may be greater than or equal to 0.3. In addition, x may be less than 0.55, or may be less than or equal to 0.5, from the viewpoint of suppressing irreversible low temperature degaussing. In General Formula (I), y may be less than or equal to 0.6, or may be less than or equal to 0.5, from the viewpoint of further increasing magnetic properties.

From the same viewpoint, in General Formula (I), y may be greater than or equal to 0.15, or may be greater than or equal to 0.2. In General Formula (I), m may be greater than or equal to 4, or may be greater than or equal to 5, from the viewpoint of further increasing the coercive force. From the same viewpoint, in General Formula (I), m may be less than or equal to 13, or may be less than or equal to 12. In General Formula (I), m is preferably greater than 7.5, and is more preferably greater than or equal to 8, from the viewpoint of suppressing the irreversible low temperature degaussing. In General Formula (I), m may be 8 to 13, or may be 8 to 12, from the viewpoint of suppressing the irreversible low temperature degaussing while further increasing the coercive force.

It is preferable that the ferrite sintered magnet described above satisfies Expressions (4) and (5).

$$0.2 \leq x < 0.55 \tag{4}$$

$$7.5 < m < 14 \tag{5}$$

Expressions (4) and (5) described above are satisfied, and thus, it is possible to further suppress the irreversible low temperature degaussing, and to obtain the ferrite sintered magnet more excellent in the magnetic properties at a low temperature.

It is preferable that in General Formula (I), A includes Ca, or Ca and Sr, as a main component, from the viewpoint of increasing the magnetic properties. A may include only Ca, or may include only Ca and Sr.

In several embodiments, General Formula (I) may be represented by General Formula (II). In General Formula (I), x is identical to x1+x2 in General Formula (II). Therefore, the described contents relevant to the range of x, are also applied to the range of x1+x2. In General Formula (II), R represents at least one type of element selected from La, or a rare earth element including La and Y, and E represents at least one type of element selected from the group consisting of Sr and Ba.

$$R_{1-x1-x2}Ca_{x1}E_{x2}Fe_{m-y}Co_y \tag{II}$$

When the composition of the ferrite sintered magnet is represented by General Formula (II), Expressions (6), (7), (8), and (9) described below are satisfied. In General Formula (II), x1, x2, y, and m represent a ratio on a molar basis. That is, when the composition of the ferrite sintered magnet is represented by General Formula (I), Expression (1) may be satisfied, and when the composition of the ferrite sintered magnet is represented by General Formula (II), Expressions (6), (7), (8), and (9) may be satisfied.

$$0.1 \leq x1 \leq 0.65 \quad (6)$$

$$0 \leq x2 < 0.5 \quad (7)$$

$$0.1 \leq y \leq 0.65 \quad (8)$$

$$3 \leq m < 14 \quad (9)$$

In General Formula (II), x1 may be less than or equal to 0.6, may be less than or equal to 0.5, from the viewpoint of further increasing the coercive force. From the same viewpoint, x1 may be greater than or equal to 0.2, or may be greater than or equal to 0.3. In General Formula (II), x2 may be less than or equal to 0.4, or may be less than or equal to 0.3, from the viewpoint of further increasing the coercive force. In General Formula (II), x2 may be 0.

In General Formula (II), y may be less than or equal to 0.6, or may be less than or equal to 0.5, from the viewpoint of further increasing the magnetic properties. From the same viewpoint, in General Formula (II), y may be greater than or equal to 0.15, or may be greater than or equal to 0.2. In General Formula (II), m may be greater than or equal to 4, or may be greater than or equal to 5, from the viewpoint of further increasing the coercive force. From the same viewpoint, in General Formula (II), m may be less than or equal to 13, or may be less than or equal to 12. In General Formula (II), m is preferably greater than 7.5, and is more preferably greater than or equal to 8, from the viewpoint of improving the magnetic properties at a low temperature. In General Formula (II), m may be 8 to 13, or may be 8 to 12, from the viewpoint of suppressing the irreversible low temperature degaussing while further increasing the coercive force.

It is preferable that the ferrite sintered magnet described above satisfies Expressions (10) and (11).

$$0.2 \leq x1 + X2 < 0.55 \quad (10)$$

$$7.5 < m < 14 \quad (11)$$

Expressions (10) and (11) described above are satisfied, and thus, it is possible to further suppress the irreversible low temperature degaussing, and to obtain the ferrite sintered magnet more excellent in the magnetic properties at a low temperature.

A content ratio of each element represented in General Formula (I) and General Formula (II), can be measured by fluorescence X-ray analysis. Furthermore, the content ratio of each of the elements represented in General Formula (I) and General Formula (II), is generally identical to the blending ratio of each of the raw materials in a blending step described below. The content of boron (B) can be measured by inductive coupled plasma emission spectroscopic analysis (ICP emission spectroscopic analysis).

The content of B in the ferrite sintered magnet is 0.1 mass % to 0.6 mass %, in terms of $B_2O_3$. The content of B described above may be less than or equal to 0.5 mass %, or may be less than or equal to 0.4 mass %, from the viewpoint of further increasing the magnetic properties. The content of B described above may be greater than 0.1 mass %, or may be greater than or equal to 0.11 mass %, from the viewpoint of further increasing the magnetic properties. The content of B described above may be greater than or equal to 0.14 mass % from the viewpoint of accelerating the generation of the second subphase, or may be greater than 0.20 mass % from the viewpoint of accelerating the generation of $CaB_2O_4$. In addition, the content of B described above is preferably greater than 0.20 mass %, and may be greater than or equal to 0.21 mass %, from the viewpoint of sufficiently improving the coercive force at a low temperature. It is preferable that the content of B described above is greater than 0.2 mass % and less than or equal to 0.4 mass %, from the viewpoint of increasing the content ratio of the second subphase and the content of $CaB_2O_4$.

It is preferable that in General Formula (II), E includes Sr as a main component, from the viewpoint of increasing the magnetic properties. E may include only Sr.

It is preferable that in General Formula (I) and General Formula (II), R includes lanthanum (La), or lanthanum (La), and one or more types of elements selected from the group consisting of cerium (Ce), praseodymium (Pr), neodymium (Nd), and samarium (Sm). R may include only La.

The ferrite sintered magnet contains Si as a sub-component that is an element not represented in General Formula (I) or (II) described above. Examples of the sub-component other than Si, include Na. Such sub-components, for example, are contained in the ferrite sintered magnet as an oxide or a composite oxide thereof.

The content of Si in the ferrite sintered magnet, for example, may be less than or equal to 3 mass %, by calculating Si in terms of $SiO_2$. The content of Si in the ferrite sintered magnet and ferrite particles, may be less than 0.3 mass %, by calculating Si in terms of $SiO_2$, from the viewpoint of further increasing the magnetic properties. From the same viewpoint, the total content of Si and B in the ferrite sintered magnet and the ferrite particles, may be 0.1 mass % to 0.8 mass %, or may be 0.2 mass % to 0.5 mass %, by respectively calculating Si and B in terms of $SiO_2$ and $B_2O_3$. The content of silicon (Si) can be measured by the inductive coupled plasma emission spectroscopic analysis (the ICP emission spectroscopic analysis). The content of Na in the ferrite sintered magnet and the ferrite particles, for example, may be 0 mass % to 0.2 mass %, by calculating Na in terms of $Na_2O$.

The content of Na in the ferrite sintered magnet, for example, may be less than or equal to 0.2 mass %, may be 0.01 mass % to 0.15 mass %, or may be 0.02 mass % to 0.1 mass %, by calculating Na in terms of $Na_2O$.

Impurities contained in the raw material or inevitable components derived from manufacturing facilities may be contained in the ferrite sintered magnet, in addition to the components described above. Examples of such components include titanium (Ti), chromium (Cr), manganese (Mn), molybdenum (Mo), vanadium (V), aluminum (Al), and the like. Such components may be contained in the ferrite sintered magnet as an oxide or a composite oxide thereof. The content of the sub-component, the impurities, and the inevitable component described above, can be measured by the fluorescence X-ray analysis or the ICP emission spectroscopic analysis. The sub-component, the impurities, and the inevitable component described above, may be segregated into a grain boundary of ferrite crystalline grains of the ferrite sintered magnet, and may configure a heterophase different from the first subphase and the second subphase.

A composition range of the main phase in the ferrite sintered magnet, is set such that the overall composition of the ferrite sintered magnet described above is in the range described above.

The mean particle diameter of the crystalline grains (the ferrite particles) containing the main phase in the ferrite sintered magnet, for example, may be less than or equal to 5 μm, may be less than or equal to 4 μm, or may be 0.5 μm to 3 μm. According to such a mean particle diameter, it is possible to further increase the coercive force. The mean particle diameter of the crystalline grains of the ferrite sintered magnet, can be obtained by using the observed image of the cross-sectional surface of the ferrite sintered magnet according to TEM or SEM. Specifically, image processing is performed with respect to the observed image of SEM or TEM, in which hundreds of crystalline grains are included, and thus, a particle diameter distribution is measured. The mean value of the particle diameters of the crystalline grains, on a number basis, is calculated from the measured particle diameter distribution on a number basis. The mean value measured as described above, is set to the mean particle diameter of the crystalline grains.

The coercive force of the ferrite sintered magnet at 20° C., for example, is preferably greater than or equal to 4900 Oe, and is more preferably greater than or equal to 5000 Oe. The residual magnetic flux density of the ferrite sintered magnet at 20° C., is preferably greater than or equal to 3000 G, and is more preferably greater than or equal to 3500 G. It is preferable that the ferrite sintered magnet is excellent in both of the coercive force (HcJ) and the residual magnetic flux density (Br).

The coercive force of the ferrite sintered magnet at −30° C., for example, is preferably greater than or equal to 4900 Oe, and is more preferably greater than or equal to 5000 Oe. A temperature coefficient of HcJ to be calculated from the value of HcJ at −30° C. and 20° C., may be −0.06 to 0 [%/° C.], or may be −0.01 to 0 [%/° C.].

There is a case where the residual magnetic flux density of the magnetized ferrite magnet decreases when the ferrite magnet is cooled to a sufficiently low temperature, and then, is returned to the original temperature again. This is referred to as the irreversible low temperature degaussing. Such irreversible low temperature degaussing is essential weakness of the ferrite magnet of the related art. The ferrite sintered magnet of this embodiment has a sufficiently high coercive force, and thus, is capable of suppressing the irreversible low temperature degaussing. In addition, the temperature coefficient of HcJ is set to be less than or equal to 0[%/° C.], and thus, it is possible to suppress the irreversible low temperature degaussing.

The ferrite sintered magnet, for example, can be used in a motor or a generator. More specifically, the ferrite sintered magnet can be used as a magnet in a motor for an automobile, such as a motor for a fuel pump, a motor for automatic window, a motor for an antilock braking system (ABS), a motor for a fan, a motor for a wiper, a motor for power steering, a motor for active suspension, a motor for a starter, a motor for door lock, and a motor for electronic mirror. In addition, the ferrite sintered magnet can be used as a magnet in a motor for OA/AV equipment, such as a motor for an FDD spindle, a motor for a VTR capstan, a motor for a VTR rotation head, a motor for a VTR reel, a motor for VTR loading, a motor for a VTR camera capstan, a motor for a VTR camera rotation head, a motor for a VTR camera zoom, a motor for a VTR camera focus, a motor for a capstan of a radio-cassette recorder or the like, a motor for a CD/DVD/MD spindle, a motor for CD/DVD/MD loading, and a motor for CD/DVD optical pickup. Further, the ferrite sintered magnet can be used as magnet in a motor for household electronics, such as a motor for an air conditioner compressor, a motor for a freezer compressor, a motor for driving a power tool, a motor for a dryer fan, a motor for driving a shaver, and a motor for an automatic toothbrush. In addition, the ferrite sintered magnet can be used as a magnet in a motor for FA equipment, such as a motor for a robot shaft, a motor for driving a joint, a motor for mainly driving a robot, a motor for driving a machine tool table, and a motor for driving a machine tool belt.

Figure 3:
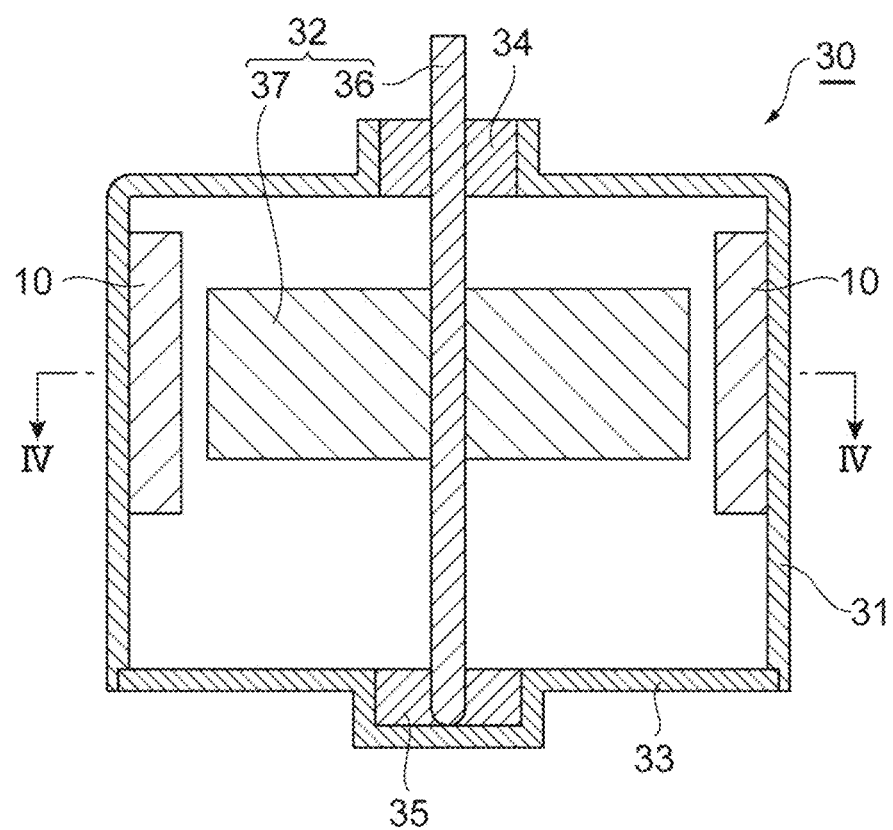
FIG. 3 is a schematic cross-sectional view illustrating one embodiment of a motor.

FIG. 3 is a schematic cross-sectional view illustrating one embodiment of the motor. A motor 30 of this embodiment includes the ferrite sintered magnet 10. The motor 30 is a direct-current motor with a brush, and includes a bottomed tubular housing 31 (a stator), and a rotatable rotor 32 that is concentrically provided on the inner circumference side of the housing 31. The rotor 32 includes a rotor shaft 36, and a rotor core 37 fixed onto the rotor shaft 36. A bracket 33 is fitted into an opening portion of the housing 31, and the rotor core is accommodated in a space formed by the housing 31 and the bracket 33. The rotor shaft 36 is rotatably supported by bearings 34 and 35 that are respectively provided in the center portion of the housing 31 and the center portion of the bracket 33 to face each other. Two C type ferrite sintered magnets 10 are fixed onto the inner circumference surface of the tubular portion of the housing 31 to face each other.

Figure 4:
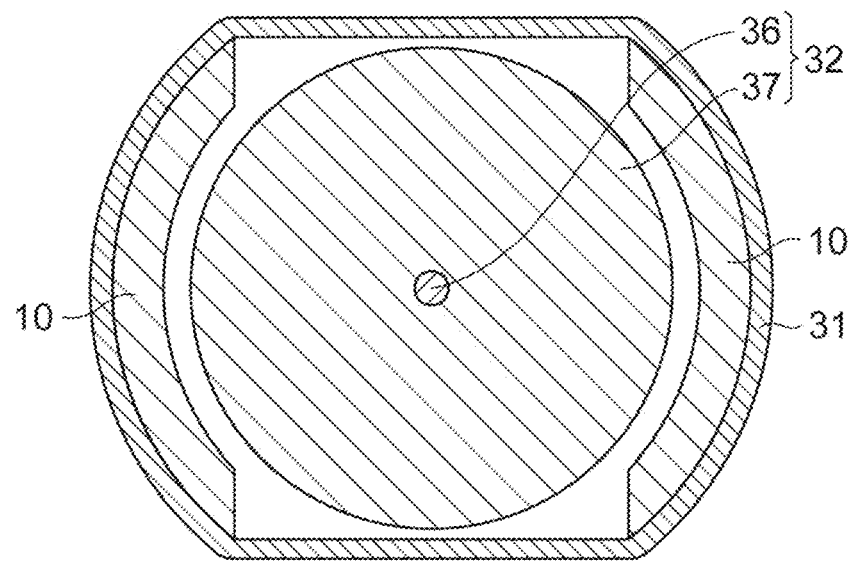
FIG. 4 is a cross-sectional view along line IV-IV of the motor of FIG. 3.

FIG. 4 is a cross-sectional view along line IV-IV of the motor 30 of FIG. 3. The ferrite sintered magnet 10 as the magnet for a motor, adheres onto the inner circumference surface of the housing 31 with an adhesive agent, by using the outer circumference surface as an adhesion surface. It is possible to decrease the thickness of the ferrite sintered magnet 10, and thus, it is possible to sufficiently decrease a gap between the housing 31 and the rotor 32. Therefore, the motor 30 can be downsized while maintaining the performance.

Next, an example of a manufacturing method of the ferrite sintered magnet will be described. The manufacturing method described below includes a blending step, a calcining step, a pulverizing step, a molding step, and a firing step. The details of each of the steps will be described below.

In the blending step, a plurality of raw materials is blended, and thus, a raw material composition is obtained. Examples of the raw material include one type or two or more types of compounds (raw material compounds) containing at least one selected from the group consisting of the elements represented in General Formula (I) or (II), and boron, as a constituent element. It is preferable that the raw material compound, for example, is in the shape of a powder. Examples of the raw material compound include an oxide, or a compound to be an oxide by firing (a carbonate, a hydroxide, a nitrate, and the like). For example, $SrCO_3$, $La(OH)_3$, $Fe_2O_3$, $BaCO_3$, $CaCO_3$, $Co_3O_4$, $B_2O_3$, and the like can be exemplified. The mean particle diameter of the powder of the raw material compound, for example, is approximately 0.1 μm to 2.0 μm, from the viewpoint of facilitating the blending.

A boron compound such as boron oxide tends to be easily dissolved in water and to be easily scattered under a heating condition, compared to other raw materials. For this reason, it is necessary that a blending ratio of the boron compound in the raw material composition of the blending step is greater than a content ratio of boron in the ferrite sintered magnet. A ratio of the blending ratio to the content ratio, for example, is 120% to 300%.

In the blending step, as necessary, a raw material compound that is a sub-component (an element simple substance, an oxide, or the like) may be blended. The raw material composition, for example, can be obtained by weighing each of the raw materials such that a desired ferrite sintered magnet is obtained, by mixing the raw materials, and then, by performing mixing and a pulverizing treatment for approximately 0.1 hours to 20 hours, with a wet type attritor, a ball mill, or the like.

In the calcining step, the raw material composition obtained in the blending step, is calcined. The calcining, for example, may be performed in an oxidizing atmosphere such as air. A calcining temperature, for example, may be 1100° C. to 1400° C., or may be 1100° C. to 1300° C. A calcining time, for example, may be 1 second to 10 hours, or may be 1 second to 3 hours. A ratio of the ferrite phase (an M phase) in a calcined powder (the ferrite particles) obtained by the calcining, for example, may be greater than or equal to 70 volume %, or may be greater than or equal to 75 volume %. The ratio of the ferrite phase, can be obtained as with the ratio of the main phase of the ferrite in the ferrite sintered magnet.

In the pulverizing step, the calcined powder that is into the shape of a granule or an agglomerate by the calcining step, is pulverized. Thus, the ferrite particles are obtained. The pulverizing step, for example, may be performed by being divided into two steps of pulverizing the calcined powder to be a coarse powder (a coarse pulverizing step), and then, of finely pulverizing the coarse powder (a fine pulverizing step).

The coarse pulverizing, for example, can be performed until the mean particle diameter of the calcined powder is 0.5 μm to 5.0 μm, by using a vibrational mill or the like. In the fine pulverizing, the coarse powder obtained by the coarse pulverizing, is further pulverized by a wet type attritor, a ball mill, a jet mill, or the like. In the fine pulverizing, the pulverizing is performed such that the mean particle diameter of the obtained fine powder (the ferrite particles), for example, is approximately 0.08 μm to 2.0 μm. A specific surface area of the fine powder (for example, obtained by a BET method), for example, is approximately 7 $m^2$/g to 12 $m^2$/g. A preferred pulverizing time is different according to a pulverizing method, and for example, in the case of the wet type attritor, the pulverizing time is 30 minutes to 10 hours, and in the case of wet type pulverizing using ball mill, the pulverizing time is 10 hours to 50 hours. The specific surface area of the ferrite particles can be measured by using a commercially available BET specific surface area measurement device (Product Name: HM Model-1210, manufactured by MOUNTECH Co. Ltd.).

In the fine pulverizing step, in order to increase a magnetic orientation degree of a sintered body obtained after being fired, for example, polyhydric alcohol represented by a general formula of $C_n(OH)_nH_{n+2}$, may be added. In the general formula, n, for example, may be 4 to 100, or may be 4 to 30. Examples of the polyhydric alcohol include sorbitol. In addition, two or more types of polyhydric alcohols may be used together. Further, other known dispersants may be used together, in addition to the polyhydric alcohol.

In a case where the polyhydric alcohol is added, the added amount, for example, may be 0.05 mass % to 5.0 mass %, or may be 0.1 mass % to 3.0 mass %, with respect to an object to be added (for example, the coarse powder). Furthermore, the polyhydric alcohol added in the fine pulverizing step, is removed by thermal decomposition in the firing step described below.

In the coarse pulverizing step and/or the fine pulverizing step, a powder such as $SiO_2$, is added as the sub-component. By adding such a sub-component, it is possible to improve sintering properties, and to improve the magnetic properties. However, it is preferable that the added amount of $SiO_2$ is not excessive, from the viewpoint of sufficiently increasing the magnetic properties.

In the molding step, the ferrite particles obtained in the pulverizing step, are molded in a magnetic field, and thus, a molded body is obtained. The molding can also be performed by any method of dry type molding and wet type molding. It is preferable that the molding is performed by the wet type molding, from the viewpoint of increasing the magnetic orientation degree.

In a case where the molding is performed by the wet type molding, for example, the fine pulverizing step described above is performed in a wet process, and thus, slurry is obtained, and then, the slurry is condensed to a predetermined concentration, and thus, slurry for wet type molding is obtained. The molding can be performed by using the slurry for wet type molding. The slurry is condensed by centrifugal separation, filter press, or the like. The content of the ferrite particles in the slurry for wet type molding, for example, is 30 mass % to 80 mass %. In the slurry, for example, water is exemplified as a dispersion medium for dispersing the ferrite particles. A surfactant such as a gluconic acid, a gluconate, and sorbitol, may be added to the slurry. A non-aqueous solvent may be used as the dispersion medium. An organic solvent such as toluene or xylene, can be used as the non-aqueous solvent. In this case, a surfactant such as an oleic acid, may be added. Furthermore, the slurry for wet type molding may be prepared by adding the dispersion medium or the like to the ferrite particles in a dry state after being subjected to the fine pulverizing.

Next, in the wet type molding, the molding is performed with respect to the slurry for wet type molding, in the magnetic field. In this case, a molding pressure, for example, is 9.8 MPa to 49 MPa (0.1 ton/$cm^2$ to 0.5 ton/$cm^2$). The magnetic field to be applied, for example, is 398 kA/m to 1194 kA/m (5 kOe to 15 kOe).

In the firing step, the molded body obtained in the molding step, is fired, and thus, the ferrite sintered magnet is obtained. The molded body can be fired in an oxidizing atmosphere such as in the atmosphere. A firing temperature, for example, may be 1050° C. to 1270° C., or may be 1080° C. to 1240° C. In addition, a firing time (a time when the firing temperature is retained), for example, is 0.5 hours to 3 hours.

In the firing step, heating may be performed at a temperature rising rate of approximately 0.5° C./minute, before reaching the firing temperature, for example, from a room temperature to approximately 100° C. Accordingly, it is possible to sufficiently dry the molded body before being sintered. In addition, it is possible to sufficiently remove the surfactant added in the molding step. Furthermore, such a treatment may be performed at the beginning of the firing step, or may be performed separately before the firing step.

Thus, it is possible to manufacture the ferrite sintered magnet. However, the manufacturing method of the ferrite sintered magnet is not limited to the example described above. For example, the molding step and the firing step may be performed in the following procedure. That is, the molding step may be performed by one type of a ceramic injection molding (CIM) molding method or a powder injection molding (PIM). In the CIM molding method, first, the dried ferrite particles are heated and kneaded along with a binder resin, and thus, a pellet is formed. The pellet is subjected to the injection molding in a mold to which the magnetic field is applied, and thus, a preformed body is obtained. The preformed body is subjected to a binder removing treatment, and thus, the molded body is obtained. More detailed procedure will be described below.

Finely pulverized slurry containing the ferrite particles obtained in the wet type pulverizing, is dried. A drying temperature, for example, may be 80° C. to 150° C., or may be 100° C. to 120° C. A drying time may be 1 hour to 40 hours, or may be 5 hours to 25 hours. The mean particle diameter of the primary particles of a magnetic powder after being dried, for example, may be 0.08 μm to 2 μm, or may be 0.1 μm to 1 μm.

The ferrite particles after being dried, are kneaded along with an organic component such as a binder resin, waxes, a lubricant, a plasticizer, and a sublimation compound, and are molded into a pellet with a pelletizer or the like. The organic component may be contained in the molded body, for example, by 35 volume % to 60 volume %, or by 40 volume % to 55 volume %. The kneading, for example, may be performed by a kneader or the like. For example, a twin-screw or single-screw extruder is used as the pelletizer. The kneading and the pellet molding may be performed while performing heating according to a melting temperature of the organic component to be used.

A polymer compound such as a thermoplastic resin is used as the binder resin. Examples of the thermoplastic resin include polyethylene, polypropylene, an ethylene-vinyl acetate copolymer, atactic polypropylene, an acrylic polymer, polystyrene, polyacetal, and the like.

Synthetic wax such as paraffin wax, urethane wax, and polyethylene glycol, is used as the waxes, in addition to natural wax such as carnauba wax, montan wax, and bees wax.

Examples of the lubricant include fatty acid ester and the like. Examples of the plasticizer include phthalic acid ester.

The added amount of the binder resin, for example, is 3 mass % to 20 mass %, with respect to 100 mass % of the ferrite particles. The added amount of the waxes, for example, is 3 mass % to 20 mass %, with respect to 100 mass % of the ferrite particles. The added amount of the lubricant, for example, is 0.1 mass % to 5 mass %, with respect to 100 mass % of the ferrite particles. The added amount of the plasticizer, for example, is 0.1 mass % to 5 mass %, with respect to 100 mass % of the binder resin.

Next, the pellet is introduced into a general magnetic field injection molding device, and the injection molding is performed with respect to a mold having a cavity in a predetermined shape. The magnetic field is applied to the mold before the injection is performed with respect to the mold. The pellet is heated and melted, for example, at 160° C. to 230° C., in the extruder, and is injected into the cavity of the mold by a screw. The temperature of the mold, for example, is 20° C. to 80° C. The magnetic field applied to the mold, may be approximately 398 kA/m to 1592 kA/m (5 kOe to 20 kOe). Thus, the preformed body is obtained by the magnetic field injection molding device.

The obtained preformed body is subjected to a heat treatment at a temperature of 100° C. to 600° C., in the atmosphere or in nitrogen, the binder removing treatment is performed, and thus, the molded body is obtained. In a case where a plurality of types of organic components is used, the binder removing treatment may be performed a plurality of times.

Next, in the firing step, the molded body subjected to the binder removing treatment, for example, is fired at a temperature of 1100° C. to 1250° C., or 1160° C. to 1230° C. for approximately 0.2 hours to 3 hours, in the atmosphere, and thus, the ferrite sintered magnet is obtained.

As described above, several embodiments of the present invention have been described, but the present invention is not limited to the embodiments described above. For example, the motor is not limited to the embodiments in FIGS. 3 and 4, and may be a motor in other forms.

EXAMPLES

The contents of the present invention will be described in more detail, with reference to examples and comparative examples, but the present invention is not limited to the following examples.

Manufacturing of Ferrite Sintered Magnet

Manufacturing Examples 1 to 11

Iron oxide ($Fe_2O_3$), calcium carbonate ($CaCO_3$), cobalt oxide ($Co_3O_4$), and lanthanum hydroxide ($La(OH)_3$) were prepared as the raw material. The raw materials were blended such that the composition of General Formula (I) was as shown in Table 1. A predetermined amount of boron oxide ($B_2O_3$) was added to a blended substance obtained as described above, and mixing and pulverizing were performed for 10 minutes by using a wet type attritor, and thus, the slurry was obtained (the blending step). In Manufacturing Examples 1 to 11, the blending ratio of each of the raw materials was changed such that the ferrite sintered magnet having the composition shown in Table 1 was obtained.

The slurry was dried, and then, the calcining was performed in which the slurry was retained at 1300° C. for 2 hours in the atmosphere, and thus, the calcined powder was obtained (the calcining step). The obtained calcined powder was subjected to the coarse pulverizing for 10 minutes by using a small rod vibrational mill, and thus, the coarse powder was obtained. 0.2 mass % of silicon oxide ($SiO_2$) was added to the coarse powder. After that, the fine pulverizing was performed for 35 hours by using a wet type ball mill, and thus, the slurry containing the ferrite particles was obtained (the pulverizing step).

The slurry obtained after the fine pulverizing, was adjusted such that a solid content concentration was 73% to 75%, and thus, the slurry for wet type molding was obtained. The slurry for wet type molding was molded in the applied magnetic field of 796 kA/m (10 kOe) by using a wet type magnetic field molding machine, and thus, a cylindrical molded body having a diameter of 30 mm×a thickness of 15 mm was obtained (the molding step). The obtained molded body was dried at a room temperature in the atmosphere, and then, the firing was performed in which the molded body was retained at 1180° C. for 1 hour, in the atmosphere (the firing step). Thus, a cylindrical ferrite sintered magnet was obtained.

<Composition Analysis>

The content of boron (B) and silicon (Si) in the ferrite sintered magnet of each of the manufacturing examples, was measured in the following procedure. 0.1 g of a sample of ferrite sintered magnet, was mixed with 1 g of sodium peroxide and 1 g of sodium carbonate, and was heated and melted. The molten substance was dissolved in a solution of 40 ml of pure water and 10 ml of a hydrochloric acid, and then, pure water was added, and thus, 100 ml of a solution was obtained. By using the solution, the content of boron was obtained by calculating boron in terms of $B_2O_3$, and the content of silicon was obtained by calculating silicon in terms of $SiO_2$, according to ICP emission spectroscopic analysis (ICP-AES). In the ICP emission spectroscopic analysis, an analysis device (Device Name: ICPS 8100CL) manufactured by Shimadzu Corporation, was used, and in the measurement, matrix matching was performed. In General Formula (I) described above, x, y, and m were calculated on the basis of the blending ratio of the raw material in the blending step. The results are shown in Table 1.

<Analysis of Subphase>

Figure 5:
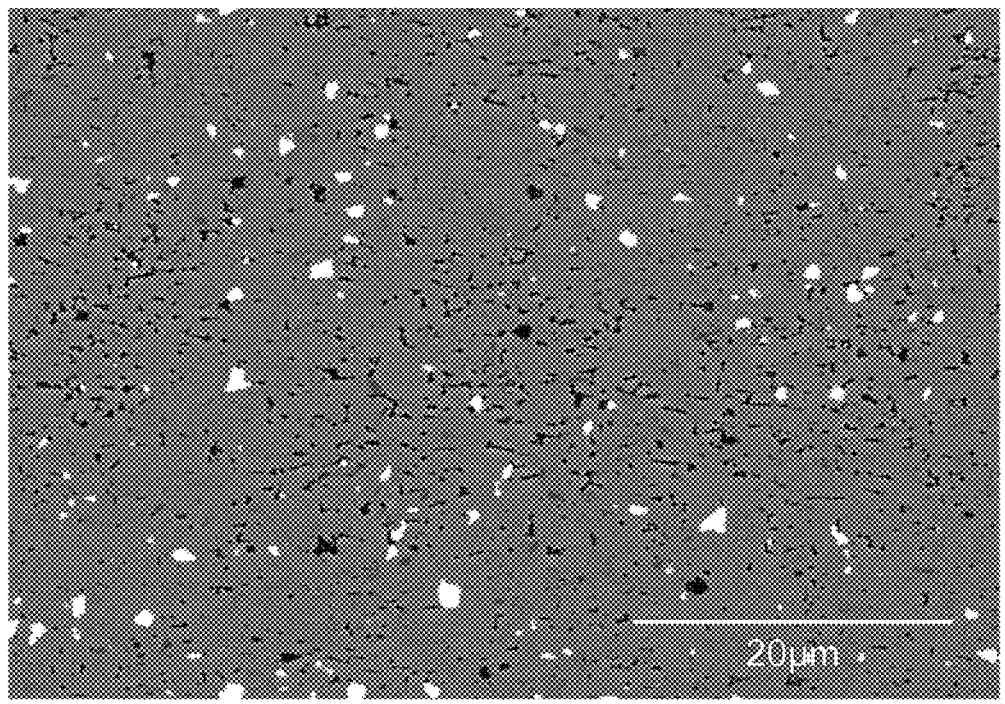
FIG. 5 is a picture showing an observed image (Magnification: 2000 times) of a cross-sectional surface of a ferrite sintered magnet of Manufacturing Example 6, according to an electron microscope.

In the ferrite sintered magnet of each of the manufacturing examples, the presence or absence of the main phase, the first subphase, and the second subphase, and each area ratio thereof, were measured by using TEM (Product Name: Titan G2, manufactured by FEI company), TEM/EDX (Product Name: Super-X, manufactured by FEI company), and TEM/EELS (Product Name: GIF Quantum ER, manufactured by Gatan, Inc.). Specifically, the ferrite sintered magnet was cut such that the cross-sectional surface parallel to an orientation axis was able to be seen, and the cross-sectional surface was observed by using a scanning transmission electron microscope. In the observed image as shown in FIG. 5, the main phase having approximately the same composition as the overall composition of the ferrite sintered magnet, two types of heterophases having a color different from that of the main phase, were identified. Then, the first subphase (a white portion in the observed image) and the second subphase (a black portion in the observed image) were identified by TEM/EDX and an electron energy-loss spectrometer attached to TEM (TEM/EELS, Product Name: GIF Quantum ER, manufactured by Gatan, Inc.). The observed image was subjected to image analysis, and thus, the area ratio of the first subphase and the second subphase on the cross-sectional surface of the ferrite sintered magnet was obtained. The results are shown in Table 2. In addition, the distinction between the examples and the comparative examples is represented in the remarks column of Table 2.

<Identification of Crystalline Phase of Second Subphase>

Figure 6:
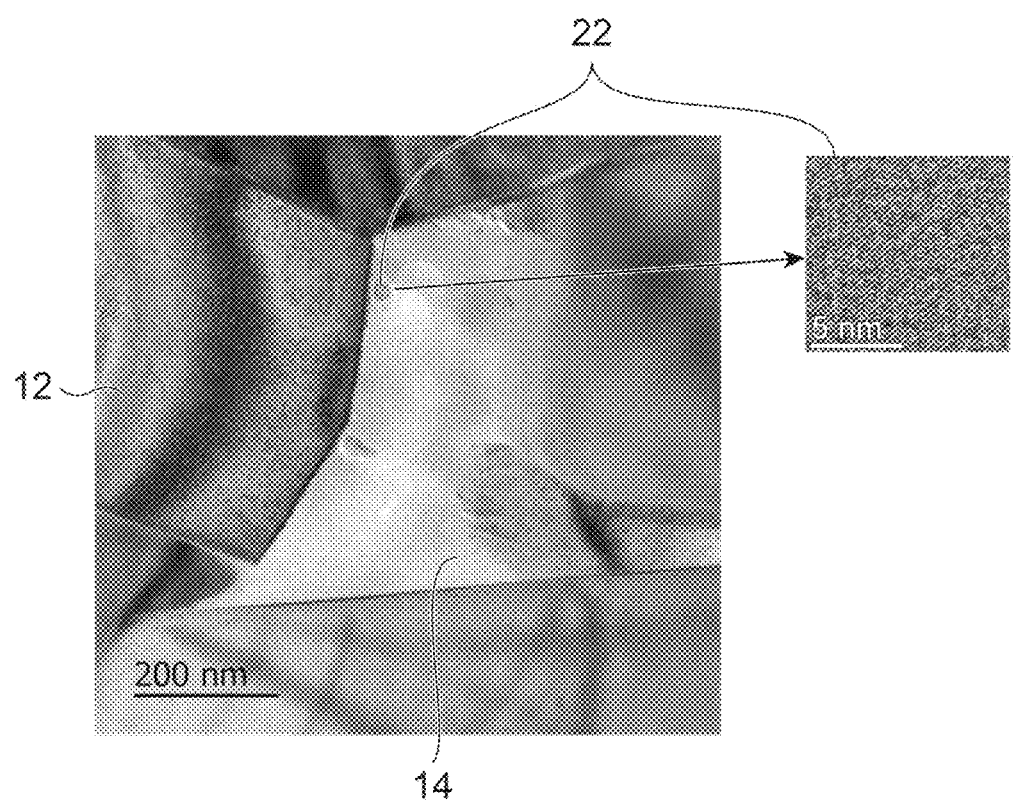
FIG. 6 is an image when a second subphase surrounded by a main phase, and the vicinity thereof, are observed with a high-resolution transmission electron microscope (HR-TEM), on the ferrite sintered cross-sectional surface of Manufacturing Example 6.
Figure 7:
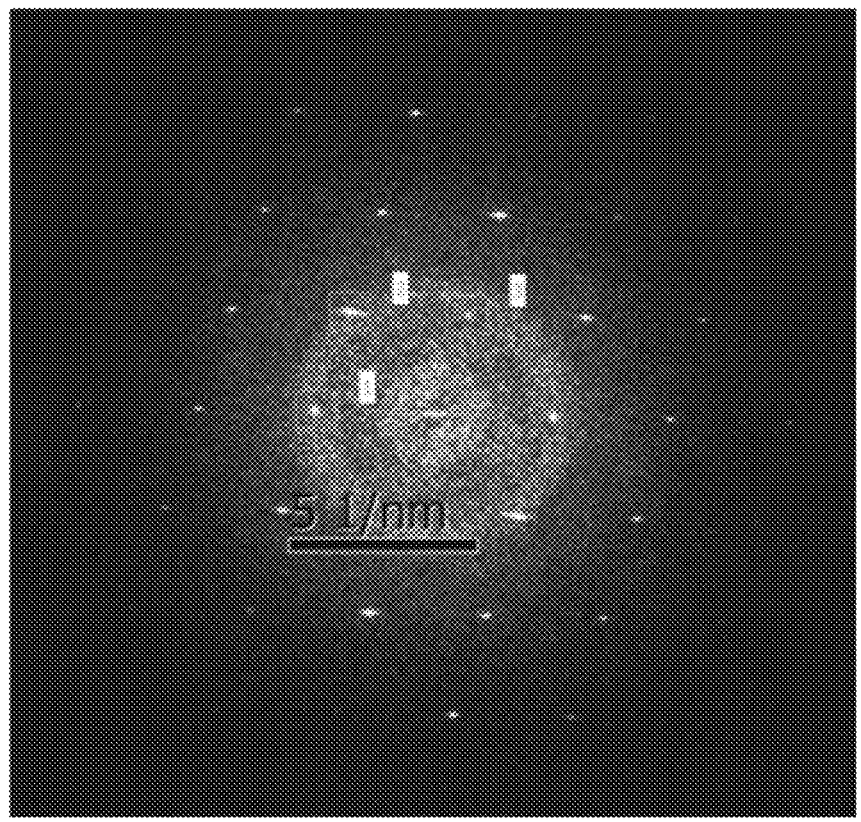
FIG. 7 is a Fourier transformation image of a compound sensed in FIG. 6.

FIG. 6 is an image when the second subphase 14 surrounded by the main phase 12, and the vicinity thereof, are observed by a high-resolution transmission electron microscope (HRTEM), on the ferrite sintered cross-sectional surface of Manufacturing Example 6. As shown in FIG. 6, it was confirmed that in the second subphase 14, a compound 22 (a crystal) having a color different from that of the surroundings, was generated. Therefore, two-dimensional Fourier transformation was performed with respect to a high resolution image of the compound 22, and thus, a Fourier transformation image of FIG. 7 was obtained. The Fourier transformation image was analyzed as with an electron diffraction image, and a crystalline phase of the compound 22 was identified. Specifically, the surface spacing of the crystal surfaces was obtained from spots indicating periodicity appearing on the Fourier transformation image, and an angle (a surface angle) between two crystal surfaces was obtained from an angle between two spots. The crystalline phase was identified on the basis of the surface spacing and the surface angle of two crystal surfaces. The value of the surface spacing and the surface angle affects an error according to measurement and a fluctuation according to a composition, and thus, the surface spacing has an allowable error range of ±8%, and the surface angle has an allowable error range of ±2 degrees.

As a result of identifying the crystalline phase of the compound 22, on the basis of the surface spacing and the surface angle of two crystal surfaces, it was confirmed that the compound 22 was $CaB_2O_4$. The same analysis was performed with respect to the ferrite sintered magnet of each of the manufacturing examples, containing the second subphase, and thus, the presence or absence of $CaB_2O_4$ was confirmed.

<Quantitation of $CaB_2O_4$>

Figure 8:
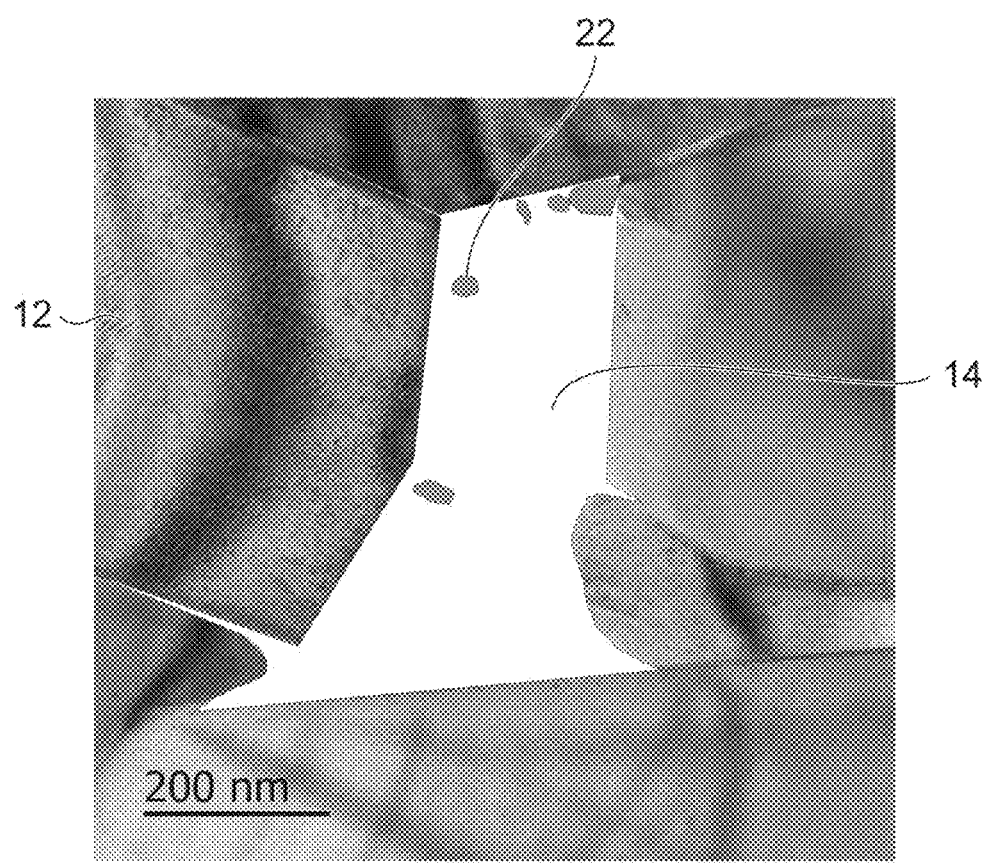
FIG. 8 is a model diagram corresponding to an HRTEM image of FIG. 6.

In the ferrite sintered magnet of each of the manufacturing examples, containing $CaB_2O_4$, quantitative analysis of $CaB_2O_4$ was performed by using an HRTEM image as shown in FIG. 6. FIG. 8 is a model diagram corresponding to the HRTEM image of FIG. 6, for describing an analysis method. As shown in FIG. 6 and FIG. 8, the $CaB_2O_4$ compound 22 is scattered in the second subphase 14. Therefore, the image analysis of the second subphase 14 was performed, an area ratio of the $CaB_2O_4$ compound 22 to the second subphase 14, was obtained. Then, the area ratio, and the area ratio of the second subphase 14 on the cross-sectional surface of the ferrite sintered magnet, were multiplied together, and thus, the area ratio of the $CaB_2O_4$ compound 22 on the cross-sectional surface of the ferrite sintered magnet, was calculated. The results are shown in Table 2.

[Evaluation of Ferrite Sintered Magnet]

<Evaluation of Magnetic Properties>

The upper and lower surfaces of the ferrite sintered magnet were processed, and then, the magnetic properties at 20° C. and −30° C., were measured by using a B-H tracer having the maximum applied magnetic field of 29 kOe. Accordingly, the residual magnetic flux density [Br(G)] and the coercive force [HcJ(Oe)], the temperature coefficient of HcJ, and a temperature coefficient of Br at each of the temperatures, were obtained. The magnetic properties at −30° C. were measured by using a cooling device using a chiller and a Peltier element, and the sample of the prepared ferrite sintered magnet, and a peripheral portion of the sample of the measurement of the BH tracer, and the atmosphere were cooled to −30° C., and the temperature of the sample and the peripheral portion of the measurement was stabilized, and then, the measurement was performed. Accordingly, the residual magnetic flux density [Br(G)] and the coercive force [HcJ(Oe)] at −30° C., were measured. The results are shown in Table 3. Furthermore, the magnetic properties at −30° C., was performed in a part of the manufacturing examples.

In Table 3, the temperature coefficient of HcJ and the temperature coefficient of Br were obtained according to the following expressions.

Temperature Coefficient of HcJ(%/° C.)=[HcJ$_{(20°\ C.)}$−HcJ$_{(-30°\ C.)}$]/50(° C.)/HcJ$_{(20°\ C.)}$×100

Temperature Coefficient of Br (%/° C.)=[Br$_{(20°\ C.)}$−Br$_{(-30°\ C.)}$]/50(° C.)/Br$_{(20°\ C.)}$×100

In the expressions described above, HcJ$_{(20°\ C.)}$ and HcJ$_{(-30°\ C.)}$ respectively represent HcJ(Oe) at 20° C. and −30° C. Br$_{(20°\ C.)}$ and Br$_{(-30°\ C.)}$ respectively represent Br(G) at 20° C. and −30° C.

TABLE 1

| | Composition | | | | | |
|---|---|---|---|---|---|---|
| Manufacturing Example | Fe m − y | Co y | R (La) 1 − x | A (Ca) x | $B_2O_3$ Mass % | $SiO_2$ Mass % |
| Manufacturing Example 1 | 9.3 | 0.28 | 0.56 | 0.44 | 0.02 | 0.2 |
| Manufacturing Example 2 | 9.4 | 0.28 | 0.57 | 0.43 | 0.05 | 0.2 |
| Manufacturing Example 3 | 9.5 | 0.30 | 0.57 | 0.43 | 0.11 | 0.2 |
| Manufacturing Example 4 | 9.5 | 0.30 | 0.57 | 0.43 | 0.14 | 0.2 |
| Manufacturing Example 5 | 9.5 | 0.30 | 0.55 | 0.45 | 0.21 | 0.2 |
| Manufacturing Example 6 | 9.5 | 0.29 | 0.58 | 0.42 | 0.22 | 0.2 |
| Manufacturing Example 7 | 9.5 | 0.30 | 0.58 | 0.42 | 0.34 | 0.2 |

TABLE 1-continued

| Manufacturing Example | Composition | | | | | |
|---|---|---|---|---|---|---|
| | Fe m − y | Co y | R (La) 1 − x | A (Ca) x | B₂O₃ Mass % | SiO₂ Mass % |
| Manufacturing Example 8 | 9.5 | 0.30 | 0.58 | 0.42 | 0.42 | 0.2 |
| Manufacturing Example 9 | 9.5 | 0.30 | 0.58 | 0.42 | 0.64 | 0.2 |
| Manufacturing Example 10 | 7.2 | 0.30 | 0.60 | 0.40 | 0.04 | 0.2 |
| Manufacturing Example 11 | 7.2 | 0.30 | 0.60 | 0.40 | 0.22 | 0.2 |

TABLE 2

| Manufacturing Example | Area ratio of first subphase (%) | Area ratio of second subphase (%) | Area ratio of CaB₂O₄ in second subphase (%) | Area ratio of CaB₂O₄ in sintered magnet (%) | Remarks |
|---|---|---|---|---|---|
| Manufacturing Example 1 | 3.6 | Absent | Absent | Absent | Comparative Example |
| Manufacturing Example 2 | 3.5 | Absent | Absent | Absent | Comparative Example |
| Manufacturing Example 3 | 3.2 | Absent | Absent | Absent | Comparative Example |
| Manufacturing Example 4 | 3.0 | 0.8 | Absent | Absent | Example |
| Manufacturing Example 5 | 2.3 | 9.9 | 4.2 | 0.42 | Example |
| Manufacturing Example 6 | 2.0 | 10.5 | 5.6 | 0.59 | Example |
| Manufacturing Example 7 | 1.6 | 16.4 | 10.1 | 1.66 | Example |
| Manufacturing Example 8 | 2.0 | 3.1 | 1.5 | 0.05 | Example |
| Manufacturing Example 9 | 2.7 | Absent | Absent | Absent | Comparative Example |
| Manufacturing Example 10 | 4.8 | Absent | Absent | Absent | Comparative Example |
| Manufacturing Example 11 | 2.5 | 11.7 | 6.3 | 0.74 | Example |

TABLE 3

| Manufacturing Example | Br (G) 20° C. | HcJ (Oe) 20° C. | Br (G) −30° C. | HcJ (Oe) −30° C. | Temperature Coefficient of HcJ (%/° C.) | Temperature Coefficient of Br (%/° C.) |
|---|---|---|---|---|---|---|
| Manufacturing Example 1 | 4222 | 3630 | 4616 | 3503 | 0.070 | −0.187 |
| Manufacturing Example 2 | 4247 | 3658 | — | — | — | — |
| Manufacturing Example 3 | 4302 | 5045 | 4702 | 5010 | 0.014 | −0.186 |
| Manufacturing Example 4 | 4320 | 5483 | 4713 | 5472 | 0.004 | −0.182 |
| Manufacturing Example 5 | 4311 | 6707 | 4697 | 6791 | −0.025 | −0.179 |
| Manufacturing Example 6 | 4313 | 6764 | 4697 | 6872 | −0.032 | −0.178 |
| Manufacturing Example 7 | 4148 | 5921 | — | — | — | — |
| Manufacturing Example 8 | 3829 | 5238 | — | — | — | — |
| Manufacturing Example 9 | 3481 | 4734 | — | — | — | — |
| Manufacturing Example 10 | 4105 | 4860 | — | — | — | — |
| Manufacturing Example 11 | 4107 | 6769 | — | — | — | — |

As shown in Table 1 to Table 3, Manufacturing Example 1, Manufacturing Example 2, Manufacturing Example 3, and Manufacturing Example 10, in which the content of $B_2O_3$ was less than or equal to 0.11 mass %, the second subphase was not detected, and the coercive force was low.

In addition, in Manufacturing Example 9 in which the content of $B_2O_3$ was greater than 0.6 mass %, the second subphase was not detected, and both of the residual magnetic flux density and the coercive force were low. In Manufacturing Examples 4 to 8, and Manufacturing Example 11, in which the second subphase was detected, the coercive force was sufficiently high. In addition, in Manufacturing Examples 5 and 6, it was confirmed that the temperature coefficient of HcJ had negative properties, and the irreversible low temperature degaussing was not generated.

<Analysis 1 of Composition of Each Phase>

Figure 9:
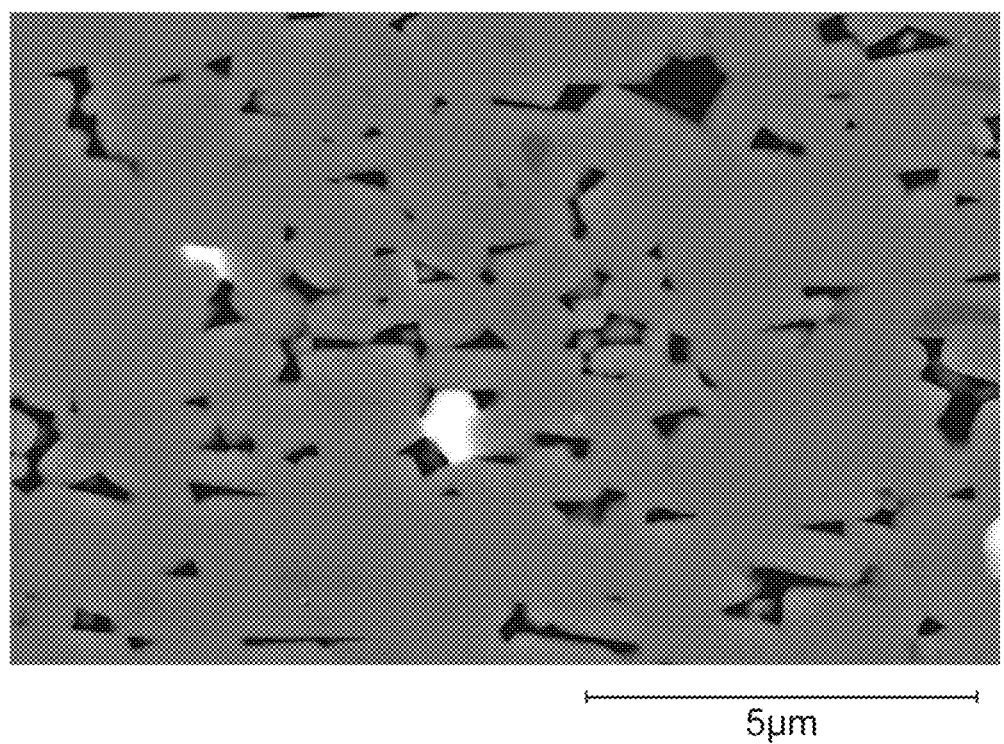
FIG. 9 is a picture of an observed image (Magnification: 10,000 times) when the cross-sectional surface of the ferrite sintered magnet of Manufacturing Example 6, is observed by using a scanning transmission electron microscope.

FIG. 5 is a picture of the observed image (Magnification: 2000 times) when the cross-sectional surface of the ferrite sintered magnet of Manufacturing Example 6, is observed by using a scanning transmission electron microscope. FIG. 9 is a picture of the observed image (Magnification: 10,000 times) when the cross-sectional surface of the ferrite sintered magnet of Manufacturing Example 6, is observed by using a scanning transmission electron microscope. In the picture of FIG. 5 and FIG. 9, a white portion represents the first subphase, a black portion represents the second subphase, and the other gray portions represent the main phase. The composition of the main phase and the first subphase, contained in the ferrite sintered magnet of Manufacturing Example 6 and Manufacturing Example 11, was measured by using TEM/EDX described above, and the composition of the second subphase was measured by using TEM/EELS described above. The same measurement was performed in Manufacturing Example 1.

The compositions of the main phase, the first subphase, and the second subphase of Manufacturing Examples 6 and 11, are shown in Table 4. The composition of the main phase of Manufacturing Examples 6 and 11, was approximately the same as the overall composition of the ferrite sintered magnet. In the main phase and the first subphase, the measurement was performed with respect to each of 13 arbitrarily selected spots, and when the total of Si, Ca, Fe, Co, and La was set to 100 atom %, an atomic ratio of each of the elements was obtained. The arithmetic mean value thereof was set to the composition of each of the phases. In the second subphase, the measurement was performed with respect to each of 13 arbitrarily selected spots, and when the total of Si, Ca, Fe, Co, La, and B was set to 100 atom %, an atomic ratio of each of the elements was obtained. The arithmetic mean value thereof was set to the composition of the second subphase. In the second subphase of Manufacturing Examples 6 and 11, Co was not contained.

TABLE 4

| Element | Manufacturing Example 6 | | | Manufacturing Example 11 | | |
|---|---|---|---|---|---|---|
| | Main phase | First subphase | Second subphase | Main phase | First subphase | Second subphase |
| Si | 0.3 | 1.3 | 2.7 | 0.1 | 0.3 | 3.4 |
| Ca | 3.7 | 4.3 | 45.9 | 5.6 | 5.1 | 45.0 |
| Fe | 85.8 | 44.9 | 4.7 | 84.7 | 47 | 6.2 |
| Co | 4.0 | 0.5 | 0.0 | 3.7 | 0.7 | 0.0 |
| La | 6.2 | 49.0 | 8.9 | 5.9 | 46.9 | 8.7 |
| B | — | — | 37.8 | — | — | 36.7 |
| Total | 100 | 100 | 100 | 100 | 100 | 100 |

In table, "-" indicates unmeasured state.

In the ferrite sintered magnet of Manufacturing Example 1, it was confirmed that the main phase and the first subphase were contained, but the second subphase was not contained. Then, a heterophase different from the main phase and the first subphase, was contained. The composition of each of the phases was measured, as with Manufacturing Examples 6 and 11. The results are shown in Table 5. The composition of the main phase of Manufacturing Example 1, was approximately the same as the overall composition of the ferrite sintered magnet.

TABLE 5

| | Manufacturing Example 1 | | |
|---|---|---|---|
| Element | Main phase | First subphase | Heterophase |
| Si | 0.1 | 0.3 | 17.9 |
| Ca | 3.7 | 9.3 | 53.2 |
| Fe | 87.6 | 44.4 | 21.2 |
| Co | 2.9 | 1.0 | 2.3 |
| La | 5.7 | 45.0 | 2.2 |
| B | — | — | 3.2 |
| Total | 100 | 100 | 100 |

In table, "-" indicates unmeasured state.

In the heterophase contained in the ferrite sintered magnet of Manufacturing Example 1, the atomic ratio of B was lower than the atomic ratio of Fe, and Co was contained.

<Analysis 2 of Composition of Each Phase>

As with "Analysis 1 of Composition of Each Phase", the composition of the main phase contained in the ferrite sintered magnet of each of the manufacturing examples, was measured by using TEM/EDX described above, and when the total of Si, Ca, Fe, Co, and La was set to 100 atom %, the element ratio of each of the elements was obtained. Then, in the main phase, the atomic ratio of Co to the total of Fe and Co, was obtained. The results are shown in Table 6. In addition, in the entire ferrite sintered magnet, the atomic ratio of Co to the total of Fe and Co, was obtained on the basis of the measured values in Table 1. The results are shown in Table 6.

In the main phase and the entire ferrite sintered magnet described above, a ratio of the atomic ratio of Co in the main phase to the atomic ratio of Co in the ferrite sintered magnet, was calculated from the value of each atomic ratio [Co/(Fe+Co)]. The value is shown in Table 6 as "Co in Main Phase/Co in Sintered Magnet".

TABLE 6

| Manufacturing Example | Main phase Co/(Fe + Co) (%) | Ferrite sintered magnet Co/(Fe + Co) (%) | Co in main phase/ Co in sintered magnet |
|---|---|---|---|
| Manufacturing Example 1 | 3.2 | 2.92 | 1.09 |
| Manufacturing Example 2 | 3.2 | 2.89 | 1.11 |
| Manufacturing Example 3 | 3.5 | 3.06 | 1.14 |
| Manufacturing Example 4 | 3.6 | 3.06 | 1.18 |
| Manufacturing Example 5 | 4.4 | 3.06 | 1.44 |
| Manufacturing Example 6 | 4.5 | 2.96 | 1.52 |
| Manufacturing Example 7 | 3.8 | 3.06 | 1.24 |
| Manufacturing Example 8 | 3.7 | 3.06 | 1.21 |
| Manufacturing Example 9 | 3.3 | 3.06 | 1.08 |
| Manufacturing Example 10 | 3.6 | 4.00 | 0.90 |
| Manufacturing Example 11 | 4.2 | 4.00 | 1.05 |

In each of the manufacturing examples, in Manufacturing Examples 5 to 8 in which $CaB_2O_4$ was contained in the second subphase, the ratio of "Co in Main Phase/Co in Sintered Magnet" was greater than 1.2. This indicates that Co in the main phase is efficiently incorporated in the main phase, and Fe in the main phase is sufficiently substituted with Co. Thus, it is considered that improvement in a substitution ratio of Fe with Co in the main phase, contributes to improvement in the coercive force and the temperature properties.

In Manufacturing Example 11 in which $CaB_2O_4$ was contained in the second subphase, "Co in Main Phase/Co in Sintered Magnet" was lower than that of Manufacturing Examples 5 to 8. It is considered that this is because in Manufacturing Example 11, as shown in Table 1, the ratio of Co to Fe in the entire ferrite sintered magnet, was high, and thus, Co was already sufficiently incorporated in the main phase. From this, even in a case where the content of Co in the entire ferrite sintered magnet, is comparatively low (Manufacturing Examples 5 to 8), $CaB_2O_4$ of the second subphase has an operation of efficiently incorporating Co in the main phase.

What is claimed is:

1. A ferrite sintered magnet, comprising:
a main phase formed of ferrite having a hexagonal magnetoplumbite crystalline structure;
a first subphase containing La, Ca, and Fe, in which an atomic ratio of La is higher than that of the main phase, and the atomic ratio of La is higher than an atomic ratio of Ca; and
a second subphase containing La, Ca, Si, B, and Fe, in which an atomic ratio of Ca is higher than an atomic ratio of La, an atomic ratio of B is higher than an atomic ratio of Fe, and the atomic ratio of Fe is lower than that of the main phase,
wherein an area ratio of the second subphase on a cross-sectional surface, is greater than or equal to 9.9%, and
wherein the area ratio of the second subphase is larger than an area ratio of the first subphase, on the cross-sectional surface.

2. The ferrite sintered magnet according to claim 1,
wherein in the second subphase, when a total of La, Ca, Si, B, and Fe is set to 100 atom %, a ratio of La is 1 atom % to 25 atom %, a ratio of Ca is 30 atom % to 70 atom %, a ratio of Si is less than or equal to 50 atom %, a ratio of B is 8 atom % to 60 atom %, and a ratio of Fe is less than or equal to 20 atom %.

3. The ferrite sintered magnet according to claim 1, wherein the area ratio of the first subphase on the cross-sectional surface is less than or equal to 5%.

4. The ferrite sintered magnet according to claim 1, wherein the ferrite sintered magnet contains $CaB_2O_4$.

5. The ferrite sintered magnet according to claim 2, wherein the ferrite sintered magnet contains $CaB_2O_4$.

6. The ferrite sintered magnet according to claim 3, wherein the ferrite sintered magnet contains $CaB_2O_4$.

7. The ferrite sintered magnet according to claim 4, wherein the second subphase contains $CaB_2O_4$.

8. The ferrite sintered magnet according to claim 5, wherein the second subphase contains $CaB_2O_4$.

9. The ferrite sintered magnet according to claim 6, wherein the second subphase contains $CaB_2O_4$.

10. The ferrite sintered magnet according to claim 4, wherein an area ratio of $CaB_2O_4$ contained in the second subphase, is less than or equal to 2%, on the cross-sectional surface.

11. The ferrite sintered magnet according to claim 5, wherein an area ratio of $CaB_2O_4$ contained in the second subphase, is less than or equal to 2%, on the cross-sectional surface.

12. The ferrite sintered magnet according to claim 6, wherein an area ratio of $CaB_2O_4$ contained in the second subphase, is less than or equal to 2%, on the cross-sectional surface.

13. A motor comprising:
the ferrite sintered magnet according to claim 1.

14. A generator comprising:
the ferrite sintered magnet according to claim 1.

15. A ferrite sintered magnet, comprising:
a main phase formed of ferrite having a hexagonal magnetoplumbite crystalline structure;
a first subphase containing La, Ca, and Fe, in which an atomic ratio of La is higher than that of the main phase, and the atomic ratio of La is higher than an atomic ratio of Ca; and
a second subphase containing La, Ca, Si, B, and Fe, in which an atomic ratio of Ca is higher than an atomic ratio of La, an atomic ratio of B is higher than an atomic ratio of Fe, and the atomic ratio of Fe is lower than that of the main phase,
wherein an area ratio of the second subphase on a cross-sectional surface, is greater than or equal to 1%, and
wherein in the second subphase, when a total of La, Ca, Si, B, and Fe is set to 100 atom %, a ratio of La is 1 atom % to 25 atom %, a ratio of Ca is 30 atom % to 70 atom %, a ratio of Si is less than or equal to 50 atom %, a ratio of B is 8 atom % to 60 atom %, and a ratio of Fe is less than or equal to 20 atom %.

16. The ferrite sintered magnet according to claim 15, wherein the ferrite sintered magnet contains $CaB_2O_4$.

17. The ferrite sintered magnet according to claim 16, wherein the second subphase contains $CaB_2O_4$.

18. The ferrite sintered magnet according to claim 16, wherein an area ratio of $CaB_2O_4$ contained in the second subphase, is less than or equal to 2%, on the cross-sectional surface.

19. The ferrite sintered magnet according to claim 15, wherein the area ratio of the second subphase on the cross-sectional surface is greater than or equal to 9.9%.

20. A ferrite sintered magnet, comprising:
a main phase formed of ferrite having a hexagonal magnetoplumbite crystalline structure;
a first subphase containing La, Ca, and Fe, in which an atomic ratio of La is higher than that of the main phase, and the atomic ratio of La is higher than an atomic ratio of Ca; and
a second subphase containing La, Ca, Si, B, and Fe, in which an atomic ratio of Ca is higher than an atomic ratio of La, an atomic ratio of B is higher than an atomic ratio of Fe, and the atomic ratio of Fe is lower than that of the main phase,
wherein an area ratio of the second subphase on a cross-sectional surface, is greater than or equal to 1%,
wherein the area ratio of the second subphase is larger than an area ratio of the first subphase, on the cross-sectional surface,
wherein the ferrite sintered magnet contains $CaB_2O_4$, and
wherein an area ratio of $CaB_2O_4$ contained in the second subphase, is less than or equal to 2%, on the cross-sectional surface.

* * * * *